United States Patent
Létard

(10) Patent No.: US 11,465,455 B2
(45) Date of Patent: Oct. 11, 2022

(54) METHOD FOR SAVING THE CONTEXT OF AN ELECTRONIC MODULE OF A TYRE PRESSURE MONITORING SYSTEM FOR A MOTOR VEHICLE

(71) Applicants: Continental Automotive France, Toulouse (FR); Continental Automotive GmbH, Hannover (DE)

(72) Inventor: Vincent Létard, Labarthe sur Léze (FR)

(73) Assignees: Continental Automotive France; Continental Automotive GmbH

( * ) Notice: Subject to any disclaimer, the term of this patent is extended or adjusted under 35 U.S.C. 154(b) by 120 days.

(21) Appl. No.: 16/961,352

(22) PCT Filed: Dec. 24, 2018

(86) PCT No.: PCT/FR2018/053538
§ 371 (c)(1),
(2) Date: Jul. 10, 2020

(87) PCT Pub. No.: WO2019/150008
PCT Pub. Date: Aug. 8, 2019

(65) Prior Publication Data
US 2020/0338938 A1    Oct. 29, 2020

(30) Foreign Application Priority Data
Feb. 1, 2018   (FR) ........................ 1850846

(51) Int. Cl.
*B60C 23/04* (2006.01)
*B60C 19/00* (2006.01)

(52) U.S. Cl.
CPC ...... *B60C 23/0462* (2013.01); *B60C 23/0416* (2013.01); *B60C 23/0481* (2013.01); *B60C 2019/004* (2013.01)

(58) Field of Classification Search
CPC .............. B60C 23/002; B60C 23/0408; B60C 23/0416; B60C 23/0433; B60C 23/0462;
(Continued)

(56) References Cited

U.S. PATENT DOCUMENTS 5,825,286 A * 10/1998 Coulthard .............. G07C 5/008
340/447
2006/0001534 A1 * 1/2006 Shida .................. B60C 23/0408
73/146

(Continued)

FOREIGN PATENT DOCUMENTS

| CN | 1783025 A | 6/2008 |
|---|---|---|
| CN | 101755307 A | 6/2010 |

(Continued)

OTHER PUBLICATIONS

International Search Report and Written Opinion for International Application No. PCT/FR2018/053538, dated Mar. 4, 2019, with partial translation, 7 pages.

(Continued)

*Primary Examiner* — Orlando Bousono
(74) *Attorney, Agent, or Firm* — RatnerPrestia

(57) ABSTRACT

A method for saving in an electronic measurement module of a tire pressure monitoring system for a motor vehicle. According to the method, as soon as a module operating error occurs, the data contained in the non-volatile random-access memory of the electronic data module are written into the read-only memory.

13 Claims, 3 Drawing Sheets

(58) Field of Classification Search
CPC ............ B60C 23/0471; B60C 23/0479; B60C 23/0481; B60C 23/0488; B60C 23/20; B60C 2019/004
See application file for complete search history.

(56) References Cited

U.S. PATENT DOCUMENTS

| | | | |
|---|---|---|---|
| 2006/0282565 A1* | 12/2006 | Kumaido | B62D 5/0493 |
| | | | 710/41 |
| 2006/0287805 A1* | 12/2006 | Enomoto | F02D 41/22 |
| | | | 701/113 |
| 2009/0024904 A1 | 1/2009 | Roohparvar et al. | |
| 2016/0243905 A1 | 8/2016 | McIntyre et al. | |
| 2016/0253169 A1* | 9/2016 | Fischer | G06F 8/654 |
| | | | 717/168 |
| 2016/0375732 A1* | 12/2016 | Lazar, II | B60C 23/0481 |
| | | | 73/115.08 |
| 2017/0043632 A1 | 2/2017 | Cruz Mendez et al. | |
| 2017/0050478 A1* | 2/2017 | Ijima | G01L 17/00 |
| 2018/0203622 A1 | 7/2018 | Ishiguro | |

FOREIGN PATENT DOCUMENTS

| | | |
|---|---|---|
| CN | 104699413 A | 6/2015 |
| EP | 3013611 B1 | 5/2016 |
| EP | 3248814 A1 | 11/2017 |
| JP | 2005162118 A | 6/2005 |
| JP | 2017087773 A | 5/2017 |
| WO | 0002741 A1 | 1/2000 |

OTHER PUBLICATIONS

International Search Report and Written Opinion for International Application No. PCT/FR2018/053538, dated Mar. 4, 2019, 11 pages (French).
Chinese Office Action for Chinese Application No. 201880088324.1, dated Nov. 29, 2021, with translation, 13 pages.

* cited by examiner

METHOD FOR SAVING THE CONTEXT OF AN ELECTRONIC MODULE OF A TYRE PRESSURE MONITORING SYSTEM FOR A MOTOR VEHICLE

CROSS REFERENCE TO RELATED APPLICATIONS

This application is the U.S. National Phase Application of PCT International Application No. PCT/FR2018/053538, filed Dec. 24, 2018, which claims priority to French Patent Application No. 1850846, filed Feb. 1, 2018, the contents of such applications being incorporated by reference herein.

FIELD OF THE INVENTION

The present invention relates in general to a tire pressure monitoring system for a motor vehicle.

It relates more particularly to a method for saving the context of the electronic units which are mounted in the wheels of a motor vehicle fitted with such a system.

BACKGROUND OF THE INVENTION

In an effort to improve safety, an increasing number of motor vehicles are nowadays fitted with systems for monitoring the pressure of the tires of a motor vehicle. These tire pressure monitoring systems, or TPMSs, make it possible, via sensors installed at the wheels of the vehicle, to have knowledge at all times of useful parameters such as the inflation pressure of, temperature of or wear on the tires, the rotational speed of the wheels, etc. Thus, the driver of the vehicle may be warned of any situation, relating to the condition of the tires, which might affect driving conditions or even constitute a danger for the vehicle, the driver and any passengers. Information collected by TMPS sensors installed at the tires, such as accelerometers, may also be used by other electronic systems of the vehicle without the driver being aware of it.

To this end, TPMSs are conventionally composed of two parts. On the one hand, electronic units for measuring at least one operating parameter of the wheel, called "wheel units" hereinafter (or WUs), mounted in each of the wheels of the vehicle and incorporating at least, other than the aforementioned sensors, a microprocessor and a radiofrequency transmitter. On the other hand, a central unit, incorporating an antenna and a radiofrequency receiver, and communicating with the wheel units by means of radiofrequency signals (receiving in most cases). Each wheel unit thus regularly takes measurements at the wheel in question and transmits the results of these measurements to the central unit which processes them and reports them, where appropriate, to the driver.

In a known example of use of TPMSs such as that described in US patent 2017/0043632 A1, incorporated herein by reference, the central unit continuously receives information relating to the pressure in each of the tires of the vehicle. Transmission takes place via radiofrequency signals with a frequency either of around 315 MHz, or of around 433 MHz. For each item of information relating to the pressure of a tire, the central unit of the TPMS compares the measured pressure value with a threshold considered to be the value beyond which driving is safe. As soon as just one of the wheel units transmits a measured pressure value which is below this threshold, the central unit generates a warning signal which is transmitted to the driver by displaying an indicator light on the instrument panel. The driver may then take the measures which are necessary to correct the problem.

This triggering of a warning may also occur for several reasons related to all of the parameters potentially measured/monitored by the wheel units: temperature, pressure, acceleration, etc.

This type of device and the measurements associated therewith are considered to be sufficiently critical for them, in certain cases, to be covered by law. Indeed, both the security of transmission of measured data (see document US 2016/0243905 A1, incorporated herein by reference) and the need to inform the driver sometimes meet requirements required by law. It is therefore essential to ensure the proper functioning of the TPMS system as a whole at all times.

Several approaches are already aimed at detecting the occurrence of one or more faults in the TPMS and, in particular, in the wheel units. This is the case, for example, when detecting the malfunction of a pressure sensor or of any other sensor within a wheel unit. Patent EP 3013611 B1, incorporated herein by reference, describes, for example, a method for detecting such a malfunction based on continuously checking the variation in the pressure values which are measured at the wheel and are transmitted to the central unit. A sensor fault is detected as soon as this variation departs from characteristic value ranges considered to be admissible. Thus, it is possible to detect that a wheel unit is no longer operating normally.

However, beyond detecting the malfunction, it may be useful, or even essential, to make it possible to understand the reasons behind it.

Generally, when a fault, associated with a major operating error of a wheel unit, is detected, the unit in question is removed from the vehicle on which it was installed. Conventionally, what is understood by a major error is an irreversible fault resulting in the inability of the wheel unit to perform its task. The wheel unit is then returned to technicians from its manufacturer to be "interrogated" in the workshop. The objective being in particular to reproduce, in the laboratory, the conditions which led to its failure and to subject it to them again in order to confirm the malfunction and to determine the specific reasons for the fault in the electronic module.

In this context, access to the memory of the wheel unit and, in particular, to the last information stored before the malfunction occurred is important. This information forms an operating context in which the wheel unit was immersed and which may make it possible to understand the source of the malfunction observed, in particular by making it possible to reproduce the operating conditions in which this malfunction was observed in the workshop.

After detecting a major error during its operation, the wheel unit switches to mute mode, i.e. it ceases all radiofrequency transmission. No more information reaches the TPMS central unit from this unit. The driver is warned thereof by the instrument panel which gives a specific warning which subsequently results in this wheel unit being returned to its manufacturer for analysis.

When the technician recovers the wheel unit to establish a diagnosis, they are able, by physically interrogating the data contained therein, to determine one of the causes of a major error (related to an oscillator, to an analog-to-digital converter or to a memory) which is at the source of the fault observed. Still, they cannot directly recover any information on the context of occurrence of the error which would allow them to reproduce it.

However, all of the information related to the context is regularly acquired by the unit and rewritten into a random-access memory to replace the corresponding information acquired previously. It may therefore have changed between the occurrence of the fault and the moment when the wheel unit was removed from the vehicle and returned for analysis and diagnosis. Additionally, this memory is systematically wiped in a reset step which is inherent to the diagnostic procedure, and is unavoidable. It may then become a long and tedious process to determine the causes of a wheel unit fault without having knowledge of the operating context in which it was immersed when this occurred. The time taken by technicians to understand the reasons for a malfunction is liable to negatively affect the image, from the customer's perspective, of the manufacturer, especially in the case of errors which recur intermittently.

Furthermore, for security and confidentiality reasons, it is not possible to transmit the context to the central unit by means of a radiofrequency signal. Specifically, the context contains data on the radiofrequency configuration itself which are at risk of being intercepted and copied.

In addition, each wheel unit is subject to substantial restrictions with regard to its power consumption which lead to limitations with regard to the management of the on-board memory. Specifically, the target autonomy for such wheel units is high (typically 10 years for a 3-volt battery). Thus, the wheel unit exhibits intermittent operation alternating between awake phases (approximately 1% of the time) during which all of its components are active, and sleep phases during which only the random-access memory operates at the minimum to collect the data acquired by the various sensors (very low power). A non-volatile random-access memory, the storage capacity of which is conventionally 64, 120 or 160 bytes, is therefore used for these operations.

Lastly, it should be noted that, regarding the read-only memory, which is a flash memory, with which the wheel units are also provided, other than the capabilities thereof being limited by the aforementioned restrictions, other technical limitations exist which relate to the writing thereof. In particular, the temperature range within which this memory can be written is more restricted than the operating temperature range of the wheel unit. Typically, this memory can be written only between −20° C. and 90° C. while the wheel unit is designed (and certified) to operate for temperatures between −40° C. and 125° C. Thus, under certain real operating conditions of the TPMS, it may occasionally be impossible to write this memory.

SUMMARY OF THE INVENTION

An aspect of the invention aims to eliminate, or at least mitigate, all or some of the aforementioned drawbacks of the prior art.

To this end, a first aspect of the invention provides a method for saving in an electronic measurement module of a tire pressure monitoring system for a motor vehicle, said electronic module comprising at least one pressure sensor, non-volatile random-access memory capable of storing at least data from sensors and read-only memory in which at least one item of operating software for the electronic module is stored, said method comprising, in response to the occurrence of an electronic module operating error, writing data contained in the non-volatile random-access memory into the read-only memory at the moment of said occurrence.

Embodiments, taken individually or in combination, further envisage:

if the temperature measured by a temperature sensor of the electronic module at the moment of the occurrence of the operating error is not within a range of values, called the write range, defined by two determined limit values, disallowance of any writing into the non-volatile random-access memory and one or more iterations of a time out of determined duration, before the writing of the data from the non-volatile random-access memory into the read-only memory after the temperature has entered the range defined by the two determined values;

the method further comprises, in response to the occurrence of an electronic module operating error, the cessation of all radiofrequency signal transmission by the electronic module;

the data contained in the non-volatile random-access memory and written into the read-only memory, in response to the occurrence of an electronic module operating error, comprise at least one from among the following parameters, taken from the electronic module: vehicle speed, vehicle acceleration, temperature, pressure, status of a time counter;

electronic module operating errors causing the writing, into the read-only memory, of data contained in the non-volatile random-access memory of said module comprise:
  a fault in an oscillator internal or external to an integrated circuit processor of the electronic module;
  a fault in an analog-to-digital converter of the integrated circuit of the electronic module; and
  a fault in a memory of the integrated circuit of the electronic module;

the duration of the time out is shorter than 64 seconds;

the limit values of the write range are the write limit values for the read-only memory of the wheel unit which are contained in the technical specifications provided by the manufacturer of the read-only memory;

at least one protected bit of the non-volatile random-access memory is used to store the disallowance of writing into said random-access memory;

if an electronic module operating error occurs following a fault in an analog-to-digital converter of said module, then the writing of all of the data contained in the non-volatile random-access memory into the read-only memory is performed immediately in response to said occurrence; and/or if the occurrence of an electronic module operating error is linked to a fault in part of the memory plane of the read-only memory, and if the addresses of the faulty bits of said read-only memory are known, then the writing, into said read-only memory, of all of the data contained in the non-volatile random-access memory is performed into an intact portion of said read-only memory.

According to a second aspect, another subject of the invention is an electronic module of a tire pressure monitoring system for a motor vehicle comprising at least one pressure sensor, temperature sensor, non-volatile random-access memory capable of storing at least data from the sensors and read-only memory on which at least one item of operating software for the electronic module is installed, said electronic module being capable of implementing all of the preceding steps of the method individually or in combination.

According to a third aspect, another subject of the invention is a tire pressure monitoring system for a motor vehicle comprising at least one central receiver and electronic module capable of communicating with each other by means of radiofrequency signals, said electronic module being capable of carrying out all of the preceding steps of the method individually or in combination.

BRIEF DESCRIPTION OF THE DRAWINGS

Other features and advantages of aspects of the invention will become more apparent upon reading the following description. This description is purely illustrative and should be read with reference to the appended drawings, in which.

In the following description of embodiments and in the figures of the appended drawings, the same or similar elements bear the same reference numerals.

DETAILED DESCRIPTION OF THE PREFERRED EMBODIMENTS

Figure 1:
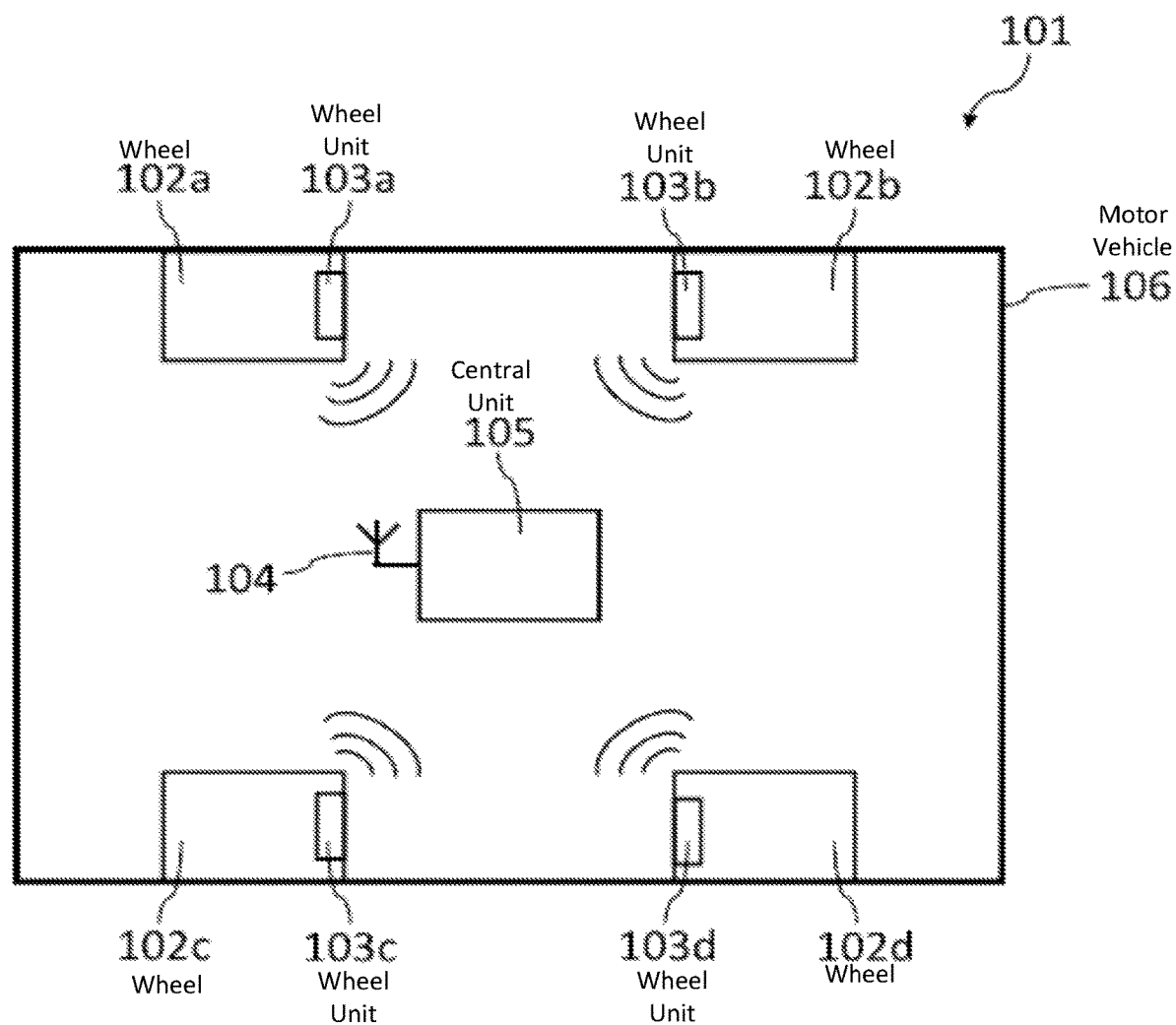
FIG. 1 is a schematic representation of a tire pressure monitoring system for a motor vehicle.

FIG. 1 is a schematic representation of a tire pressure monitoring system such as that described by patent EP 3013611 B1 for example, in which implementations of the method may be implemented.

The tire pressure monitoring system (TPMS) 101 comprises a set of wheel units, for example four such units 103a-103d, mounted on the four wheels 102a-102d, respectively, of a motor vehicle 106. As described above, these wheel units 103a-103d regularly measure various operating parameters of the corresponding wheel. They then transmit the results of these measurements, by means of radiofrequency signals, to the central unit 105 (also called the ECU for "electronic control unit"), for example on a radiofrequency carrier at 315 MHz or 433 MHz. The latter receives these signals using a dedicated antenna 104.

Furthermore, regarding the wheel units, these take the form of electronic units which may be adhesively bonded directly to an internal face of the tire or attached to an inflation valve of the tire. Incidentally, it is due to the complex mounting of these units that substantial constraints are imposed on the autonomy of wheel units so as to avoid having to replace them overly frequently, which requires the removal of the wheel and disassembly (i.e. separation) of the tire from the rim of the wheel.

Ultimately, the main function of such a TPMS is to measure the pressure of the tires. However, other functions, such as, for example, the locating of the wheels in the event of removal/refitting with the positions of the four wheels exchanged between the front and the rear or vice versa, and/or between the left and the right or vice versa, may also be part of the functionalities of the system, as well as the measuring of the vehicle's load and its front/rear and left/right distribution.

The method according to an aspect of the invention may be implemented in a device similar to that described by FIG. 1. In addition, a wheel unit is, for example, mounted on each wheel of the motor vehicle 101. Each wheel unit 103a-103d comprises an electronic circuit which controls it and which is composed at least of a microprocessor and of various memories. These memories are dedicated to storing a set of data. For example, the operating software for the unit may be stored in a read-only memory (or ROM) and the data from measurements taken by sensors may be stored by a non-volatile random-access memory (or NVRAM).

The wheel unit regularly measures a set of useful parameters by virtue of the sensors that it comprises. It may for example incorporate an accelerometer, a pressure sensor, a temperature sensor and other electronic measurement devices. From these sensors and other devices, a wheel unit may measure information which directly or indirectly determines, for example, the speed of the vehicle, the acceleration of the vehicle, the temperature at the tire, the inflation pressure of the tire, etc.

Furthermore, as described above, in order to save energy, the wheel unit may take measurements only some of the time, at regular time intervals (i.e. intervals regularly spaced apart in time), and be put to sleep for the rest of the time. It is then awoken by a counter which alternately triggers the awake and sleep phases of the wheel unit. Typically, the wheel unit may be in the awake phase only for a few milliseconds every 16 seconds.

Ultimately, all of the information acquired by a wheel unit in each awake phase forms the context in which the wheel unit operates, during this operating phase. This operating context is therefore rewritten into the NVRAM during each awake phase.

Figure 2:
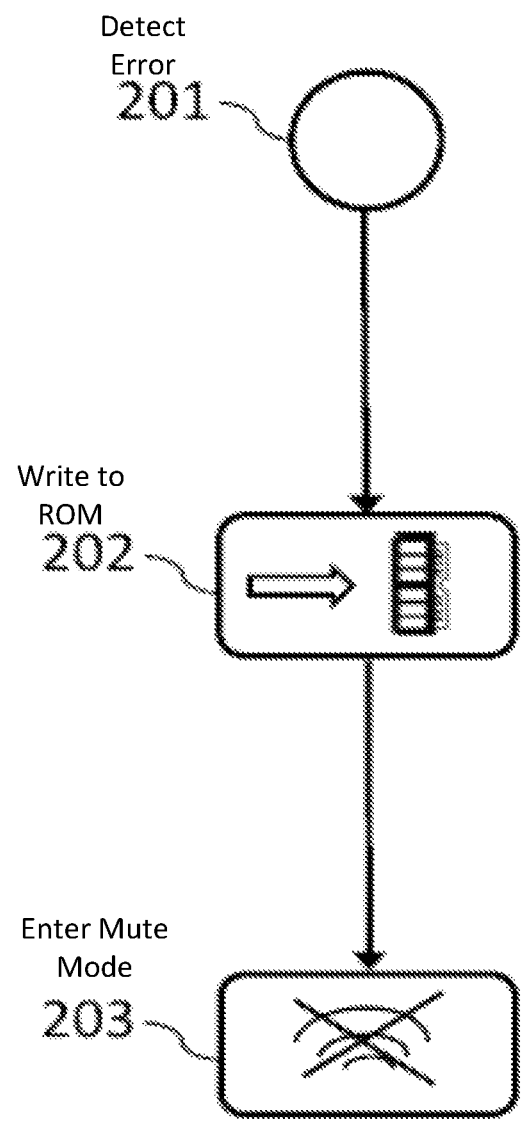
FIG. 2 shows a diagram of steps of a first embodiment of the method according to the invention.

With reference to FIG. 2, one embodiment of the method according to an aspect of the invention will now be described.

The execution of the steps of the method is triggered by the detection 201, by the wheel unit, of a major operating error. The causes of a major error occurring include in particular:

a fault in an oscillator used for the operation of the electronic circuit controlling the wheel unit. This may affect both what are called internal oscillators (RC oscillator) and what are called external oscillators (crystal oscillator);

a fault in an analog-to-digital converter with which the electronic circuit controlling the wheel unit is also provided; and a fault in a memory of the integrated circuit of the electronic module. All of the memories of the circuit may thus be affected. For example, it may be a non-volatile random-access memory, a volatile random-access memory, a register, a flash read-only memory or any other memory with which the circuit is provided.

Those skilled in the art will appreciate that this list is not limiting and that the definition of an operating error as a major error could be adapted according to the specific choices for using a TPMS.

The detection of a major error 201 leads to the execution of step 202 of writing the content of the non-volatile random-access memory into the read-only memory. This write is performed as soon as the major error occurs in order to prevent the information contained in the NVRAM from being rewritten in the meantime, for example, following new acquisitions being made by one or more sensors of the wheel unit.

Lastly, in step 203, the wheel unit enters mute mode, i.e. it no longer transmits a radiofrequency signal to the central unit of the TPMS.

Those skilled in the art will appreciate that steps 202 and 203 may also be executed in reverse order with respect to that shown in FIG. 2, or even concomitantly. In any case, they are effected simultaneously or almost simultaneously in order to avoid changes in the state of the NVRAM.

Thus, the information originally stored in the NVRAM can therefore be preserved from any rewriting by nature implying an erasure, and therefore from any modification, and can then be recovered by a technician after the extraction of the wheel unit from the vehicle. This allows quick reproduction of the exact conditions in which the wheel unit malfunction occurs. In addition, no critical information, in particular relating to the context, risks being intercepted by a malicious third party once the mute mode is activated since this information is not transmitted by radiofrequency channel between the wheel unit and the central unit of the TPMS. They cannot be recovered, to be used, in a workshop at the manufacturer of the wheel unit to which it will be returned for analysis and diagnosis.

Figure 3:
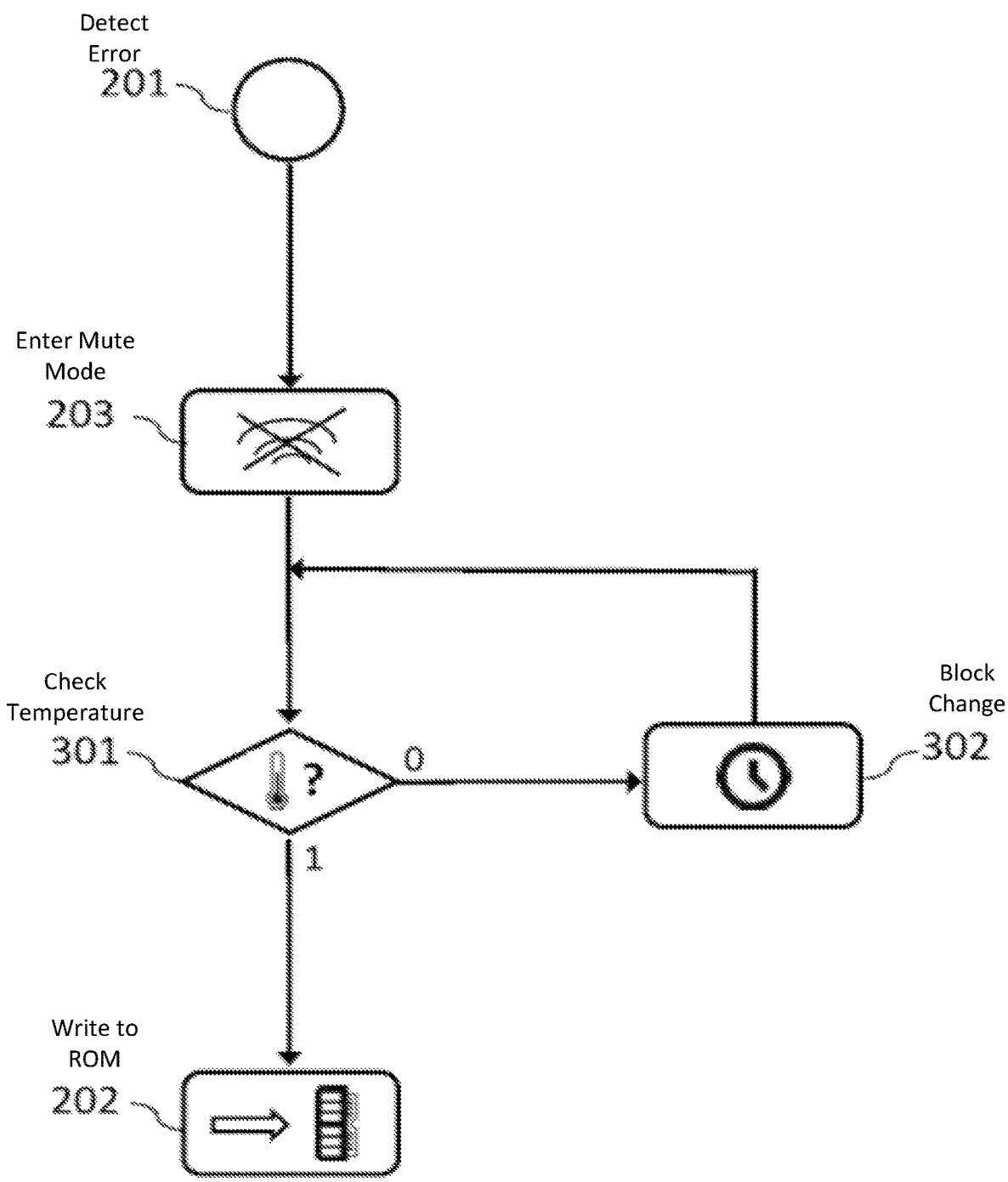
FIG. 3 shows a diagram of steps of a second embodiment of the method according to the invention.

FIG. 3 illustrates another embodiment of the saving method according to the invention.

In this embodiment, once the method is triggered by the detection of a major error 201 as in the embodiment of FIG. 2, step 203 of switching the wheel unit to mute mode is performed.

The next step 301 consists in checking the temperature (as measured by the temperature sensor of the wheel unit) to determine whether or not it is between two predetermined limit values defining a range of values called the write range. These values correspond, for example, to the temperature limits (according to the technical specifications provided by the manufacturer of the memory) within which the read-only memory may be written successfully.

If the measured temperature value is not between these limit values (for example if it is not between −20° C. and 90° C.), then step 302 introduces a time out (i.e. a waiting time) before rechecking the temperature in step 301. This time out may be set arbitrarily so as in particular to best match the maximum speed at which the temperature measured by the sensor may vary. In one embodiment, the time out is, for example, limited to a maximum of 64 seconds.

In addition, during the time out, step 302 also consists in blocking (disallowing) any change to the information contained in the NVRAM (i.e. disallowing any writing into the non-volatile random-access memory). In other words, the operating context of the wheel unit is frozen, as it is at the time when the major error occurred, in the non-volatile random-access memory (NVRAM) of the wheel unit without it being able to be changed. The electronic circuit may, for example, use one or more protected bits of the non-volatile random-access memory to store the disallowance of any new writing into the random-access memory, and in addition for the definition of the time out.

The loop including steps 301 and 302 may thus be repeated until the temperature enters the range of temperature values between the predetermined limit values. Specifically, the reasons for possibly being outside of the write temperature range may be: either a very low ambient temperature, for example in winter after a prolonged period of standstill, such that the temperature will necessarily rise as the vehicle is used after startup; or a very high ambient temperature, for example because of overheating due to the intensive use of the vehicle and the tires and the wheel heating up, for example in summer, such that the temperature will necessarily decrease after at least bringing the vehicle to a standstill.

Next, as soon as the temperature enters the range of write values applicable to the memory in question, then, and in a manner identical to the embodiment of FIG. 2, step 202 of writing the contents of the non-volatile random-access memory into the read-only memory is performed.

In addition to the advantages described with reference to the previous embodiment, this embodiment has the advantage of ensuring that the writing of the context data will be carried out under good conditions with respect to the integrity of the data written, i.e. avoiding complete failure of the write operation or any data corruption at the time of writing.

Particular embodiments may be implemented, which vary according to the type of major error detected.

For example, if a major operating error occurs following a failure of an analog-to-digital converter of the wheel unit, the writing into the read-only memory of all of the data contained in the non-volatile random-access memory may be done immediately, without introducing a time out. This is to compensate for the fact that the failure of the analog-to-digital converter prevents the achievement of conclusive temperature measurements.

Finally, in another example, if a major operating error occurs following a failure of the read-only memory of the unit such as an alteration of part of the memory plane, then the writing of all of the data contained in the non-volatile random-access memory can be performed into an intact portion of the read-only memory. This applies in the case where the error bits of the read-only memory (and their address in particular) can be identified, either natively if the memory offers this functionality, or thanks to a particular procedure within the reach of the skilled person. Otherwise, writing the context into the read-only memory could be affected, in the sense that the data could be corrupted.

An aspect of the present invention also relates to an electronic measurement module (or wheel unit) of a tire pressure monitoring system for a motor vehicle comprising at least one pressure sensor, a temperature sensor, a non-volatile random-access memory capable of storing at least data from the sensors and a read-only memory on which at least one item of operating software for the electronic module is stored, said electronic module also comprising means configured for, in response to the occurrence of an operating error of the electronic module, the writing into the read-only memory of data contained in the non-volatile random-access memory at the time of said occurrence.

It also relates to a tire pressure monitoring system for a motor vehicle comprising a central receiver or central unit and at least one electronic module according to an aspect of the invention, the central receiver and said at least one electronic module being able to communicate with each other by means of radiofrequency signals.

An aspect of the present invention has been described and illustrated in the present detailed description and in the figures of the appended drawings, with reference to advantageous implementations, but this is neither exhaustive nor limiting. Specifically, the present invention is not limited to the embodiments presented. Other variants and embodiments may be deduced and implemented by a person skilled in the art using the teachings of the present description and the drawings, and using just their general knowledge.

In the claims, the term "comprise" does not exclude other elements or other steps. A single processor or a plurality of other processing units may be used to implement an aspect of the invention. Likewise, a plurality of memories, potentially of different types, may be used to store information. The various features described and/or claimed may advantageously be combined. Their presence in the description or in different dependent claims does not exclude this possibility. The reference signs should not be understood as limiting the scope of an aspect of the invention.

The invention claimed is:

1. A method for saving tire data in an electronic module of a tire pressure monitoring system for a motor vehicle, said electronic module comprising at least one tire sensor, non-volatile random-access memory, flash read-only memory, and an electronic circuit for controlling the electronic module, said method comprising the steps of: detecting, by the at least one tire sensor of the electronic module, the tire data, writing, by the electronic module, the tire data in the non-volatile random-access memory of said electronic module, detecting, by the electronic module, an occurrence of an operating error due to a fault in at least one of the tire sensor, the non-volatile random-access memory, the flash read-only memory or the electronic circuit, and in response to detecting the occurrence of the operating error, and prior to writing over the tire data in the non-volatile random-access memory with new tire data, writing the detected tire data contained in the non-volatile random-access memory into the flash read-only memory at the moment of said occurrence.

2. The method as claimed in claim 1, further comprising, if the temperature measured by a temperature sensor of the electronic module at the moment of the occurrence of the operating error is not within a range of values, called the write range, defined by two determined values, disallowance of any writing into the non-volatile random-access memory and one or more iterations of a time out of determined duration, before the writing of the data contained in the non-volatile random-access memory into the flash read-only memory after the temperature has entered the range defined by the two determined values.

3. The method as claimed in claim 1, further comprising, in response to the occurrence of the operating error, a cessation of all radiofrequency signal transmission by the electronic module.

4. The method as claimed in claim 1, wherein the data contained in the non-volatile random-access memory and written into the flash read-only memory, in response to the occurrence of an electronic module operating error, comprise at least one from among the following parameters, taken from the electronic module: a vehicle speed, a vehicle acceleration, a temperature, a pressure, or a status of a time counter.

5. The method as claimed in claim 1, wherein electronic module operating errors causing the writing, into the flash read-only memory, of data contained in the non-volatile random-access memory of said electronic module comprise at least one of: a fault in an oscillator internal or external to an integrated circuit processor of the electronic module; a fault in an analog-to-digital converter of the integrated circuit of the electronic module; and a fault in a memory of the integrated circuit of the electronic module.

6. The method as claimed in claim 2, wherein the duration of the time out is shorter than 64 seconds.

7. The method as claimed in claim 1, wherein the two determined values of the write range are write limit values for the flash read-only memory of the electronic module which are contained in technical specifications of the electronic module provided by a manufacturer of the flash read-only memory.

8. The method as claimed in claim 1, wherein at least one protected bit of the non-volatile random-access memory is used to store a disallowance of any writing into said random-access memory.

9. The method as claimed in claim 2, wherein, if an electronic module operating error occurs following a fault in an analog-to-digital converter of said electronic module, then the writing of all of the data contained in the non-volatile random-access memory into the flash read-only memory is performed immediately in response to said electronic module operating error following the fault in the analog-to-digital converter of said electronic module.

10. The method as claimed in claim 2, wherein, if the occurrence of an electronic module operating error is linked to a fault in part of a memory plane of the flash read-only memory, and if addresses of faulty bits of said flash read-only memory are known, then the writing, into said flash read-only memory, of the data contained in the non-volatile random-access memory is performed into an intact portion of said flash read-only memory.

11. The method as claimed in claim 2, further comprising, in response to the occurrence of an electronic module operating error, a cessation of all radiofrequency signal transmission by the electronic module.

12. An electronic module of a tire pressure monitoring system for a motor vehicle comprising: at least one tire sensor; a non-volatile random-access memory capable of storing at least data from the tire sensor; a flash read-only memory on which at least one item of operating software for the electronic module is stored; and an electronic circuit for controlling the electronic module, said electronic module configured to: detect, by the at least one tire sensor of the electronic module, the tire data, writing, by the electronic module, the tire data in the non-volatile random-access memory of said electronic module, detect, by the electronic module, an occurrence of an operating error due to a fault in at least one of the tire sensor, the non-volatile random-access memory, the flash read-only memory or the electronic circuit, and in response to detecting the occurrence of the operating error, and prior to writing over the tire data in the non-volatile random-access memory with new tire data, write the detected tire data contained in the non-volatile random-access memory into the flash read-only memory at the moment of said occurrence.

13. A tire pressure monitoring system for a motor vehicle comprising: a central receiver; and an electronic module capable of communicating by means of radiofrequency signals, said electronic module including: at least one tire sensor, a non-volatile random-access memory capable of storing at least data from the tire sensor, a flash read-only memory on which at least one item of operating software for the electronic module is stored, and an electronic circuit for controlling the electronic module, said electronic module configured to: detect, by the at least one tire sensor of the electronic module, the tire data, writing, by the electronic module, the tire data in the non-volatile random-access memory of said electronic module, detect, by the electronic module, an occurrence of an operating error due to a fault in at least one of the tire sensor, the non-volatile random-access memory, the flash read-only memory or the electronic circuit, and in response to detecting the occurrence of the operating error, and prior to writing over the tire data in the non-volatile random-access memory with new tire data, write the detected tire data contained in the non-volatile random-access memory into the flash read-only memory at the moment of said occurrence.

* * * * *